(12) United States Patent
Bich et al.

(10) Patent No.: US 7,401,457 B2
(45) Date of Patent: Jul. 22, 2008

(54) AUGER FINGER WITH TETHER FOR RETAINING AND RETRACTING THE FINGER WHEN BROKEN

(75) Inventors: Gary L. Bich, New Holland, PA (US); Daniel J. Klein, Indiana, PA (US); Benjamin W. Ditchcreek, New Holland, PA (US); James F. Rayfield, New Holland, PA (US)

(73) Assignee: CNH America LLC, New Holland, PA (US)

( * ) Notice: Subject to any disclaimer, the term of this patent is extended or adjusted under 35 U.S.C. 154(b) by 326 days.

(21) Appl. No.: 11/194,226

(22) Filed: Aug. 1, 2005

(65) Prior Publication Data

US 2007/0022727 A1    Feb. 1, 2007

(51) Int. Cl.
A01D 34/52    (2006.01)

(52) U.S. Cl. .......................... 56/294; 56/364

(58) Field of Classification Search ............ 56/364, 56/400, 12.4, 330, 400.21, 294; 172/21, 172/22; 198/613, 722, 693
See application file for complete search history.

(56) References Cited

U.S. PATENT DOCUMENTS

| 2,701,634 | A | | 2/1955 | Carroll | 198/211 |
|---|---|---|---|---|---|
| 3,126,693 | A | | 3/1964 | Renn | 56/364 |
| 3,175,347 | A | * | 3/1965 | Scheidenhelm | 56/400 |
| 3,912,404 | A | | 10/1975 | Katt | 403/2 |
| 4,182,597 | A | | 1/1980 | Derschmidt | 416/134 A |
| 4,214,511 | A | | 7/1980 | Mueller | 98/37 |
| 4,271,956 | A | | 6/1981 | Hutchinson et al. | 198/613 |
| 4,882,899 | A | * | 11/1989 | Jasper et al. | 56/220 |
| 5,285,622 | A | * | 2/1994 | Klinner | 56/130 |
| 5,484,217 | A | | 1/1996 | Carroll et al. | 403/2 |
| 5,595,052 | A | | 1/1997 | Jasper et al. | 56/220 |
| 5,884,432 | A | | 3/1999 | DeLillo | 49/49 |
| 6,042,292 | A | | 3/2000 | Belanger et al. | 403/2 |
| 6,158,571 | A | | 12/2000 | Gosa | 198/613 |
| 6,199,357 | B1 | * | 3/2001 | Bloom | 56/220 |
| 6,467,246 | B1 | * | 10/2002 | McCredie | 56/296 |
| 6,640,527 | B2 | | 11/2003 | Farley et al. | 56/12.4 |
| 6,668,534 | B2 | | 12/2003 | Sheedy et al. | 56/364 |

* cited by examiner

Primary Examiner—Thomas B. Will
Assistant Examiner—Mai T Nguyen
(74) Attorney, Agent, or Firm—Michael G. Harms; John William Stader; Patrick M. Sheldrake

(57) ABSTRACT

A finger for a crop gathering auger of a grain header for an agricultural combine, including a tether which spans a failure region of the finger and will retain a free end of the finger in connection with a mounting end thereof when the failure region is broken, and which is preferably additionally operable for automatically retracting the broken off free end into an auger drum and retaining it therein during subsequent rotation of the drum for limiting potential damage from the broken end and preventing entry of the broken end into crop handling equipment of the combine.

25 Claims, 6 Drawing Sheets

AUGER FINGER WITH TETHER FOR RETAINING AND RETRACTING THE FINGER WHEN BROKEN

TECHNICAL FIELD

This invention relates generally to a finger for a crop gathering auger of a grain header for an agricultural combine, and more particularly, to an auger finger including a tether which spans a failure region of the finger and will retain a free end of the finger in connection with a mounting end thereof when the failure region is broken, and which is preferably additionally operable for automatically retracting the broken off free end into an auger drum and retaining it therein during subsequent rotation of the drum for limiting potential damage from the broken end and preventing entry of the broken end into crop handling equipment of the combine.

BACKGROUND ART

It is well known to provide stiff, hard fingers of steel or other rigid material protruding radially outwardly from a central region of a drum of a rotating crop gathering auger of a grain header of an agricultural combine, for raking crops into an inlet opening of a feeder operable for conveying the crops into a threshing system of the combine. Reference generally in this regard, Farley et al., U.S. Pat. No. 6,640,527 entitled Center Feed Finger Adjustment Mechanism For Header. As illustrated in the Farley et al. patent, such fingers are typically mounted on an auger finger shaft or other element located within the auger drum in axially offset relation to a rotational axis of the drum, and protrude radially outwardly through holes in an outer cylindrical surface of the drum.

It is additionally well known to provide a failure region at a predetermined location along the length of such fingers, such as a groove or the like, such that, in the event that a large, solid or hard object such as a stone or rock, a stump or fence post or fragment thereof, an animal skeleton or part thereof, or the like, is encountered and attempted to be raked by a finger, forces exerted by the rotation of the drum applied through the finger against the object, if sufficiently strong, will cause the finger to break at the failure region. Induction of the broken off end of the finger into the feeder, and subsequent passage into the threshing system and other systems of the combine is to be avoided, as the end of the finger can jam the mechanisms thereof and/or cause damage such as breakage and result in machine downtime.

Therefore, to avoid such occurrences, the failure region is typically located within the auger drum, and the end of the finger located radially outwardly of the failure region can include a retainer or detent element, such as a pin thereacross, located within the drum, for preventing removal of the broken end of the finger from the drum. However, in the event of breakage of the finger, the broken free end of the finger can undesirably flail about the exterior of the drum during the rotation thereof, so as to strike the floor or pan of the header during the rotation resulting in annoying noise, or, if the free end falls into the drum, it can undesirably move around freely therein so as to also create annoying noise, and it can possibly damage or jam other components located therein, and be difficult to find and retrieve.

Thus, what is sought is an apparatus for retaining a broken free end of an auger finger, which overcomes one or more of the problems and disadvantages set forth above.

SUMMARY OF THE INVENTION

What is disclosed is an auger finger with a tether for retaining the finger when broken, which overcomes one or more of the problems and disadvantages set forth above.

According to a preferred aspect of the invention, the auger finger includes a mounting end portion adapted to be mounted within a drum of an auger in connection with a support element offset axially from a rotational axis of the drum, and an elongate free end portion opposite the mounting end portion, which projects radially outwardly from the drum. The auger finger includes a failure region at a predetermined location along the length thereof, which, when intact, connects the mounting and free end portions, the failure region being constructed so as to be weaker than at least the mounting end portion so as to break and disconnect the mounting and free end portions when the finger is subjected to a predetermined side loading condition.

Importantly, the finger includes at least one tether connected between the free end and mounting end portions and spanning the failure region, so as to be capable of holding the free end portion in connection with the mounting end portion while allowing relative pivotal movement therebetween if the failure region is broken. As a result, in the event of breakage of the failure region, the tethered connection of the broken free end portion to the mounting end portion will allow the mounting end portion, in cooperation with further rotation of the drum, to automatically retract the free end portion into the drum and hold the free end in a suitable position therein, such that the finger will not undesirably flail about the exterior of the drum during subsequent rotation, or, become loosened and lost or inducted into a threshing system of a combine with which the finger is used, or flail about inside the drum when retracted therein.

According to a preferred aspect of the invention, the at least one tether is pivotally connected to at least one of the free end portion and the mounting end portion so as to allow limited relative longitudinal movement therebetween when the failure region is broken, to facilitate the relative pivotal movement of the free and mounting end portions about the broken failure region, and the automatic retraction of the free end into the drum.

According to another preferred aspect of the invention, the finger includes two of the tethers, on opposite sides of the finger, respectively, which allow relative movement of the mounting and free end portions of the finger only in a predetermined transverse direction corresponding to a direction of rotation of a drum on which the finger is mounted, to limit undesirable movements of the free end of the broken finger, while still facilitating the automatic retraction of the broken free end into the drum.

And, according to still another preferred aspect of the invention, the tether is connected to the mounting and free end portions by manually removable devices, such as locking safety clips, cotter pins, or the like, to allow removal of the free end portion from the mounting end portion when the failure region is broken.

DETAILED DESCRIPTION OF THE INVENTION

Figure 1:
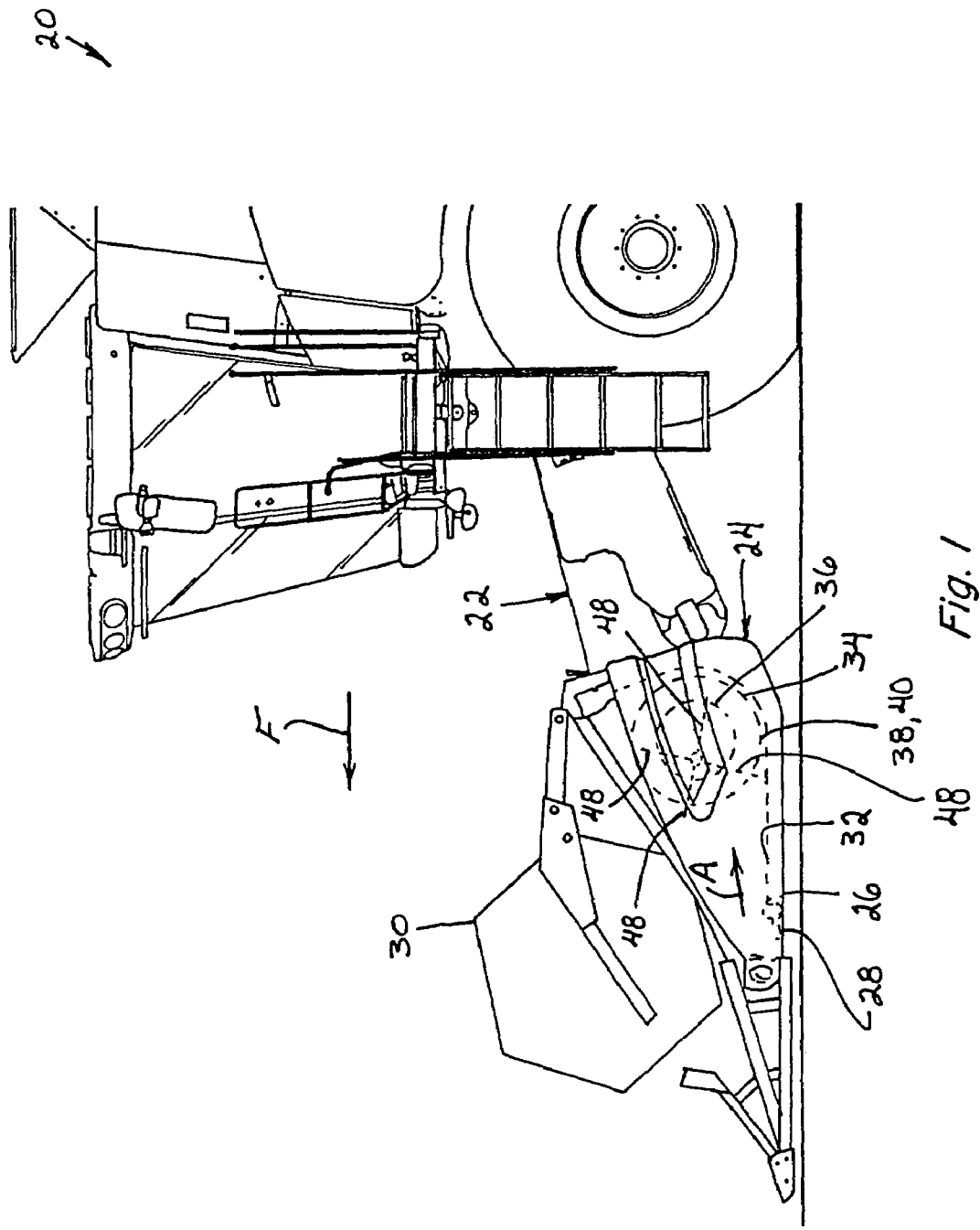
FIG. 1 is a simplified side view of a grain header supported on a feeder on the front end of an agricultural combine, and showing in dotted lines a gathering auger on the header, including an array of auger fingers of the invention extending radially outwardly from a drum of the auger at angularly spaced locations therearound.

Referring now to the drawings, in FIG. 1, the front end of a conventional agricultural combine 20 is shown, including a feeder 22 supporting a grain header 24 conventionally operable for cutting and gathering crops containing grain, such as wheat and other grasses, legumes such as soybeans, and the like, in the well known conventional manner. Header 24 has a front end 26 including cutter apparatus 28 extending along the width thereof, configured and operable for severing crops (not shown) from the ground during movement of combine 20 in a forward direction, denoted by arrow F.

Header 24 includes a reel 30 disposed above cutter apparatus 28 and rotatable for directing the cut crops rearwardly onto and along a generally flat, horizontal floor or pan 32 of header 24, into a gathering auger 34 extending across the width of the header adjacent to the rear of pan 32. Auger 34 includes a hollow cylindrical drum 36 having opposite right hand and left hand helical flights 38 and 40 extending around opposite end portions thereof, respectively. Auger 34 is rotatable about a rotational axis 42 (FIG. 2), and flights 38 and 40 are rotatable therewith for conveying crop material from opposite end regions of the header toward the center region thereof. Feeder 22 includes an inlet opening (not shown) just rearwardly of the center region of header 24, for receiving the augered crops, in the well known manner.

To facilitate flow and induction of the crops into the inlet of feeder 22, drum 36 includes an array of auger fingers 48 at longitudinally and angularly spaced locations therearound which rotate therewith and are configured to reciprocally move telescopically radially outwardly therefrom and radially inwardly therein during the rotation, for raking the crop material into feeder 22, in the well known manner.

Figure 2:
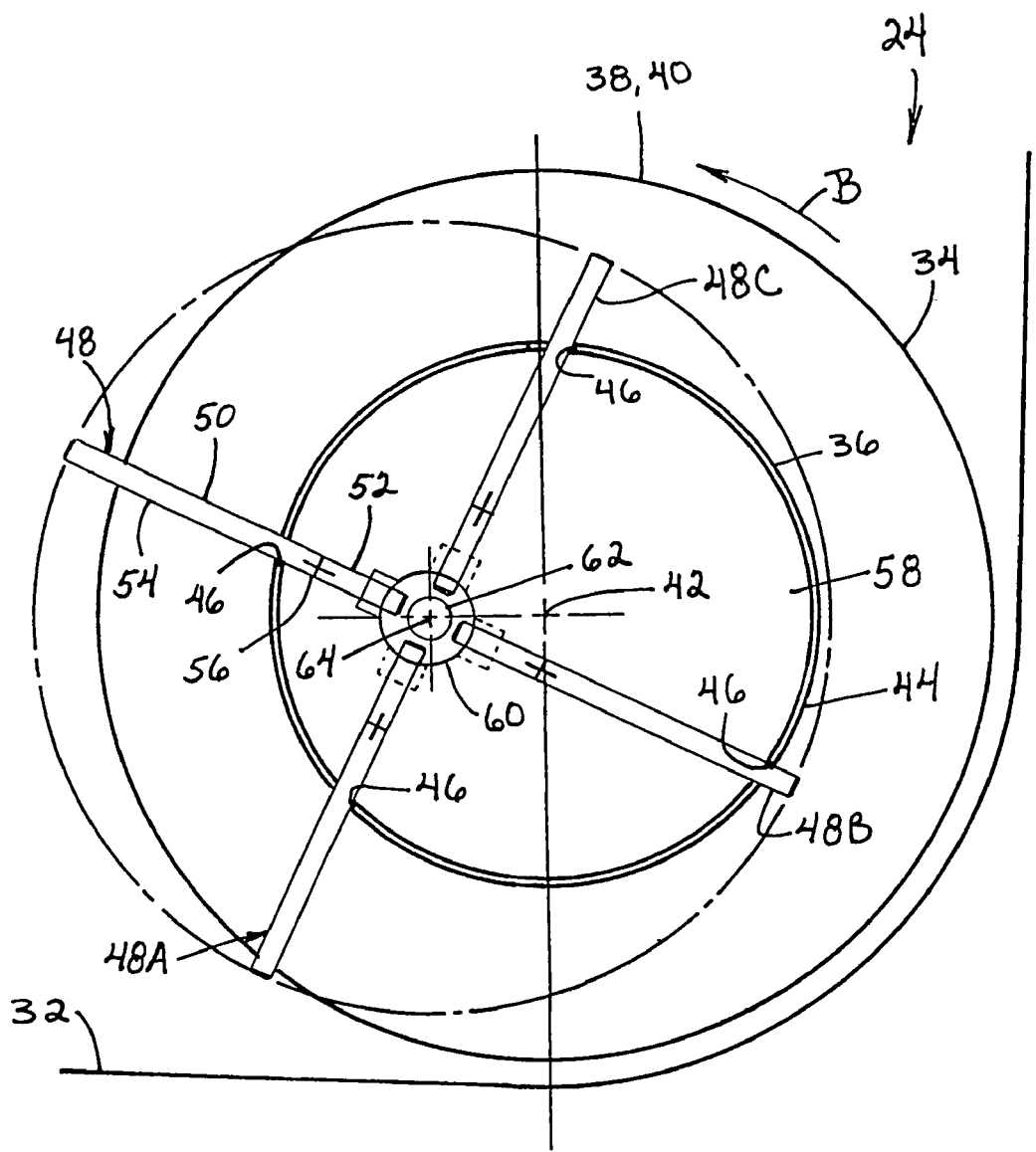
FIG. 2 is a simplified schematic side view of the header and auger of FIG. 1, illustrating one of the auger fingers at several rotational positions of the drum of the auger.

Referring also to FIG. 2, auger 34 of header 24 is shown. The rotation of auger 34 is denoted by arrow B, about axis 42 through drum 36. As noted above, drum 36 is hollow, and it includes a longitudinally and angularly spaced array of holes through an outer cylindrical surface 44 thereof, represented by hole 46. An auger finger constructed and operable according to the teachings of the invention, is positioned in and extends outwardly through each of the holes of the array, as illustrated by auger finger 48 in hole 46. As will be explained, each of the auger fingers, as represented by auger finger 48, telescopically extends outwardly through its hole, represented by a hole 46, by a different amount, depending on the rotational position of drum 36 about axis 42. To illustrate, auger finger 48 is shown in a first rotational position telescopically extending in an upwardly and forwardly directed orientation from drum 36, in preparation for raking.

The auger finger is denoted by number 48A at a second rotational position of drum 36, telescopically extending forwardly and downwardly in a raking position and orientation. The auger finger is denoted by number 48B at a third rotational position of the drum, extending rearwardly and downwardly and mostly telescopically retracted into the drum. And, the auger is denoted by number 48C in a rearward and upwardly directed orientation re-emerging from the drum. Thus, it should be evident that by rotation of drum 36 in the direction denoted by arrow B in FIG. 2, an auger finger will project telescopically a substantial distance from drum 36 in a gathering or raking mode through a portion of a revolution of the drum, as denoted by numbers 48 and 48A, then will retract into drum 36 through another portion of the revolution, as denoted by number 48B and 48C, once the crop has been raked rearwardly into the feeder.

Referring also to FIGS. 2, 3, 4 and 5, each of the auger fingers of the invention, represented by auger finger 48, includes an elongate rigid body 50 constructed of a suitable material such as, but not limited to, a metal such as steel or aluminum. Body 50 includes a mounting end portion 52, a free end portion 54, and a failure region 56 at a predetermined location between mounting and free end portions 52 and 54, connecting portions 52 and 54 together. Failure region 56 is preferably located in relation to mounting end portion 52, so as to be located at all times within an internal cavity 58 of drum 36, while free end portion 54 extends radially outwardly from drum 36 through the range of rotational positions thereof, as best illustrated in FIG. 2.

Figure 3:
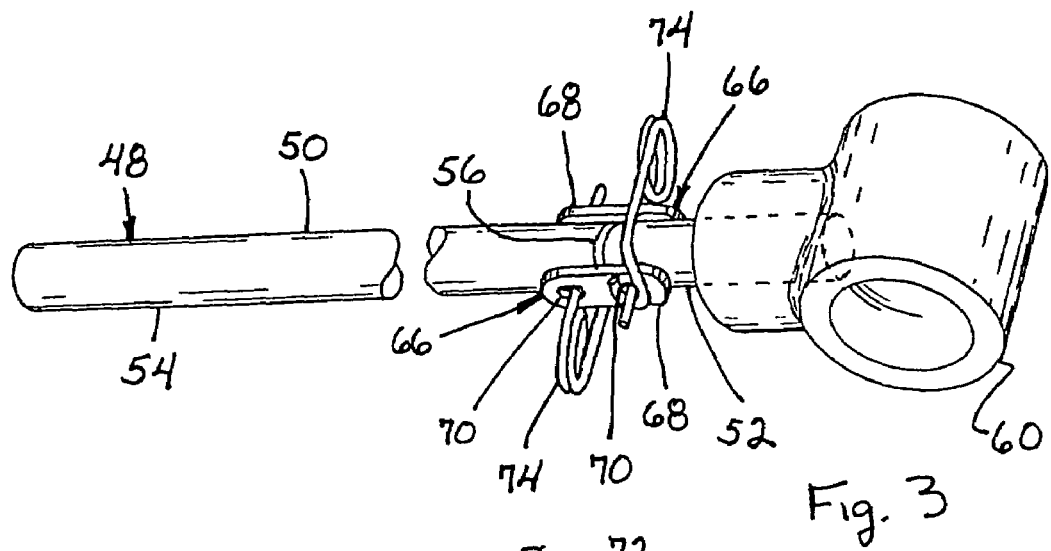
FIG. 3 is a perspective view of the auger finger of FIG. 2, shown mounted on a mounting sleeve mountable on an auger finger shaft of the drum.
Figure 4:
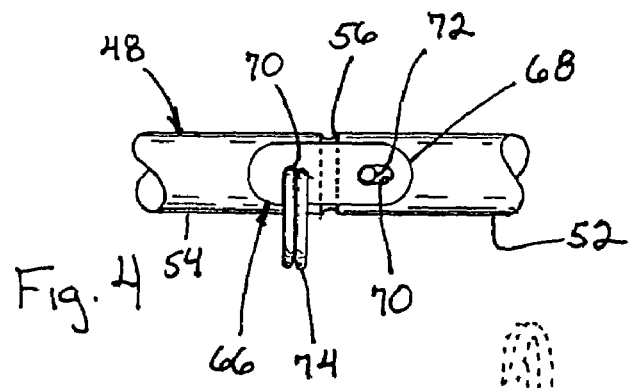
FIG. 4 is a fragmentary side view of the auger finger of FIG. 2.
Figure 5:
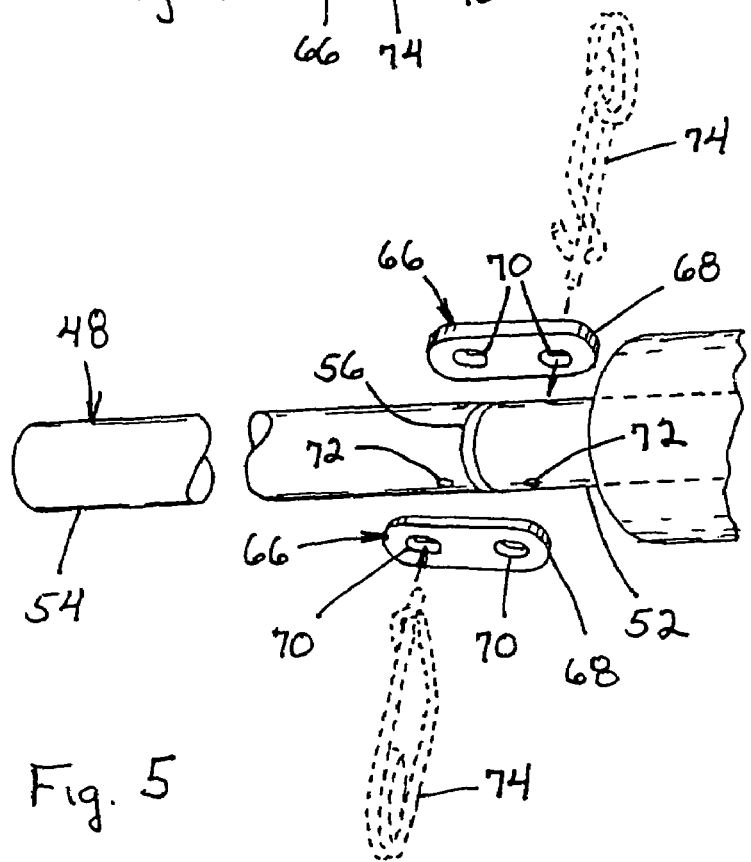
FIG. 5 is a perspective view of the auger finger, with tethers of the invention shown in exploded form, illustrating assembly thereof.

Mounting end portion 52 is adapted to be received and held in a hole through a side of a mounting flange or sleeve, illustrated by mounting sleeve 60 in FIGS. 2 and 3, which in turn, is mounted for rotation about a sidewardly extending auger finger shaft 62 located in internal cavity 58 of drum 36. Auger finger shaft 62 is mounted at a fixed location within internal cavity 58 in axially offset relation to axis 42, such that the mounting sleeves, represented by sleeve 60, will be rotatable about an auger finger shaft axis 64 extending longitudinally through shaft 62. Mounting end portion 52 can be secured to sleeve 60 in any desired manner, such as by using one or more commercially available roll pins or fasteners, or by threaded engagement, or the like, in the well known manner, preferably so as to enable easy and quick removal and replacement.

Failure region 56 can comprise any suitable construction which will result in breakage of body 50 at that location as a result of application of at least a predetermined threshold side loading condition, the magnitude of which can be determined as required or desired for a particular application, it being understood that failure region 56 is to be weaker than at least mounting end portion 52, such that in the event of application of a side load against the finger of at least the threshold value, the finger will break at failure region 56 and not at mounting end portion 52 or another undesired location. To provide this capability, failure region 56 can comprise suitable structure, such as a circumferential groove around body 50, a notch, or the like, to provide the desired weakening so as to be subject to breakage before other portions of body 50, particularly mounting end portion 52.

As noted above, in the event of breakage of a finger, such as finger 48 at failure region 56, it is desirable for the broken or detached free end portion 54 to be retained in connection with drum 36, so as not to be subject to induction into feeder 22 and subsequent conveyance or passage into other regions of combine 20 wherein consequential damage therefrom could result. It has likewise been found to be undesirable for the broken portion of a finger to flail about the exterior of drum 36 so as to cause noise and potentially damage nearby components of header 24. Thus, it has been found to be desirable to have the capability to retract a broken segment of a finger into internal cavity 58 and to hold the broken portion therein in a position and orientation so as to cause no further damage.

This desirable capability is achieved according to the present invention by providing at least one tether 66, and preferably two tethers 66, connected between mounting end portion 52 and free end portion 54 of each auger finger, so as to span failure region 56 thereof and hold or retain free end portion 54 in the event failure region 56 is broken. Tether 66 additionally preferably allows relative pivotal movement of mounting end portion 52 and free end portion 54, to allow passage of free end portion 54 over an object contact with which caused the breakage of failure region 56, and to allow and facilitate retraction of free end portion 54 through hole 46 into internal cavity 58 of drum 36, by continued rotation of the drum.

Figure 9:
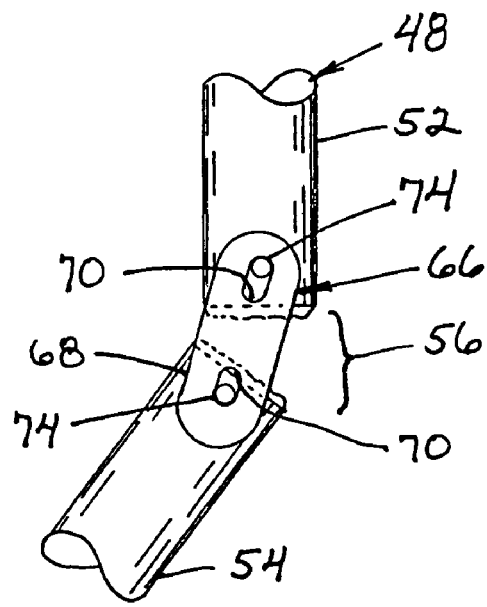
FIG. 9 is another fragmentary side view of the auger finger, illustrating relative pivotal movement of the mounting and free end portions thereof when the failure region is broken.

To provide this capability, tether 66 preferably includes a rigid link 68 which spans failure region 56 and includes a pair of holes 70 therethrough which align with holes 72 through mounting end portion 52 and free end portion 54, so as to jointly receive suitable retaining elements therethrough. Here, the tethers 66 are shown on opposite sides of finger 48, respectively, held in position by a pair of retaining elements which are locking safety pins 74. This configuration is desirable and preferred, as it will allow relative pivotal movement between mounting end portion 52 and free end portion 54 when failure region 56 is broken, only in a transverse direction generally perpendicular to holes 72 through end portions 52 and 54, as best illustrated in FIG. 9. Here, an attendant advantage of using locking safety pins 74, is that they can be easily and conveniently manually removed, to allow removal of tethers 66, and removal of free end portion 54 from mounting end 52 when failure region 56 is broken.

Referring also to FIGS. 6, 7, 8 and 9, a sequence of steps failure or breakage of failure region 56 and resultant relative pivotability of end portions 52 and 54 of finger 48 as facilitated by tethers 66, is shown. Here, it should first be observed that so as to provide the capability of easy relative pivotal movement of mounting end portion 52 and free end portion 54 in the event of breakage of failure region 56, tethers 66 are configured to allow a limited amount of relative longitudinal movement of mounting end portion 52 and free end portion 54 upon breakage of failure region 56, to provide clearance for the edges of the broken region to pivot past one another. This capability is preferably provided by at least one, and more preferably both, of holes 70 through link 68 of each tether 66 being elongate longitudinally relative to finger 48, or otherwise suitably enlarged.

Figure 6:
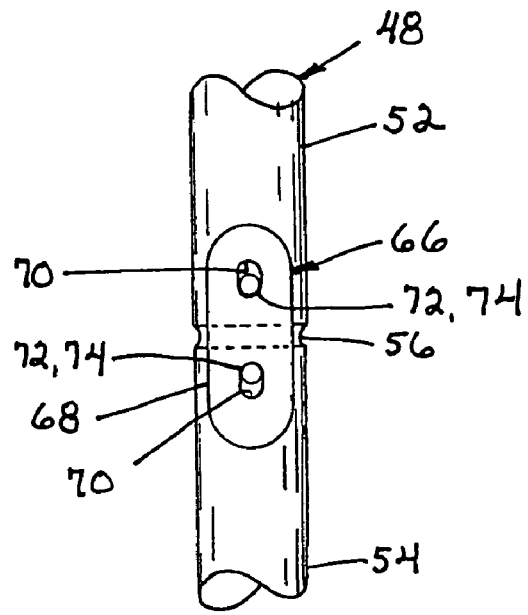
FIG. 6 is another fragmentary side view of the auger finger.
Figure 7:
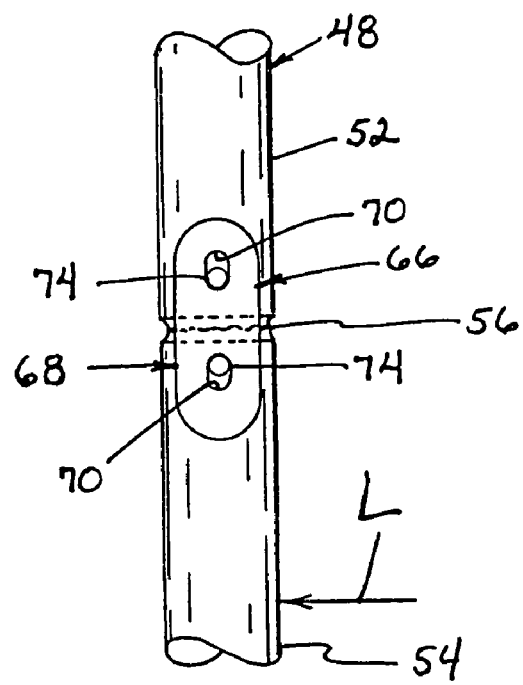
FIG. 7 is a fragmentary side view of the auger finger, showing breakage of a failure region thereof.
Figure 8:
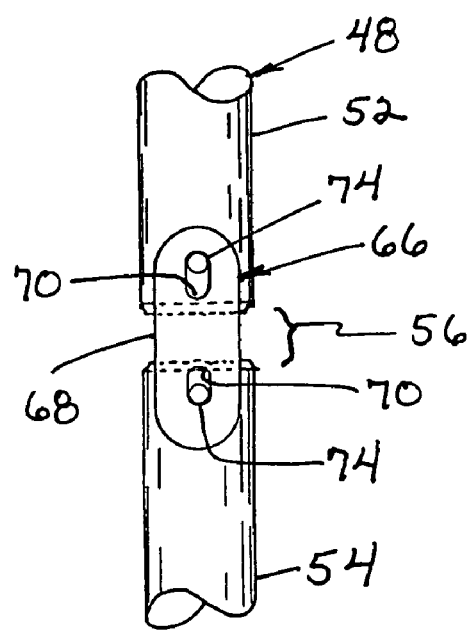
FIG. 8 is another fragmentary side view of the auger finger, showing separation of free and mounting end portions of the finger and retention of the free end portion by the tethers of the invention.

Referring more particularly to FIG. 6, failure region 56 is shown intact, and safety pins 74 extend through holes 70 in link 68 of tether 66 and holes 72 in end portions 52 and 54, respectively, holes 70 being enlarged so as to extend longitudinally outwardly beyond holes 72. In FIG. 7, failure region 56 is shown fractured or broken, as a result of application of a side load, denoted by arrow L, against free end portion 54, free end portion being retained on end portion 52 by tether 66. In FIG. 8, failure region 56 is shown broken apart, such that free end portion 54 is longitudinally spaced from mounting end portion 52 while still being retained by tether 66, pins 74 now being located at the opposite ends of elongate holes 70 of link 68.

FIG. 9 illustrates pivoting of free end portion 54 relative to mounting end portion 52, as allowed by the now existent space therebetween resulting from fracture and breakage of failure region 56, and the elongation of holes 70 of tether 66 which still retains the end portions together. This pivotability is useful and desirable, for instance, to allow free end portion 54 of finger 48 to pass over an object contacted by free end portion 54 which resulted in the application of load L thereagainst and the breakage of failure region 56, as will be illustrated. The pivotability also has utility for facilitating automatic retraction of free end portion 54 into the auger drum, as will be illustrated.

FIGS. 10, 11, 12, 13, 14 and 15 show a sequence of rotation of auger 34 of header 24 resulting in breakage of failure region 56 of auger finger 48 caused by contact with a hard object 76 conveyed onto pan 32 of header 24 and too large to pass between pan 32 and the bottom of drum 36 of auger 34. This is intended to be illustrative of a wide variety of incidents that may result in breakage of a finger, such as, but not limited to, contact with a large stone or rock, a fence post, log or stump, an animal carcass or skeleton, or a part or parts of any of these.

Figure 10:
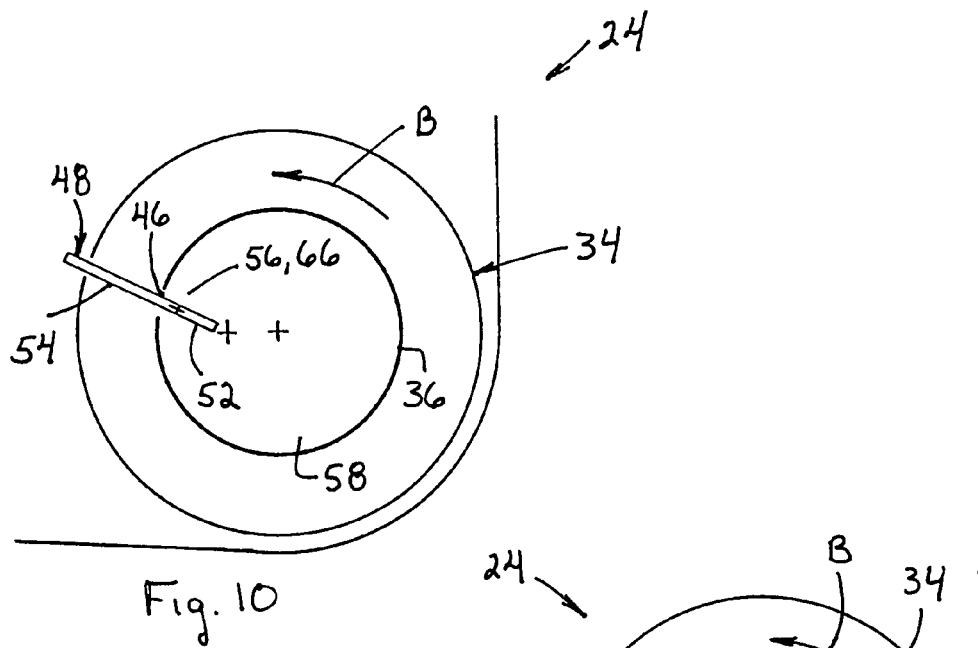
FIG. 10 is a simplified schematic side view of the header of FIG. 1, illustrating rotation of the auger thereof with a finger of the auger in a first rotational position.
Figure 11:
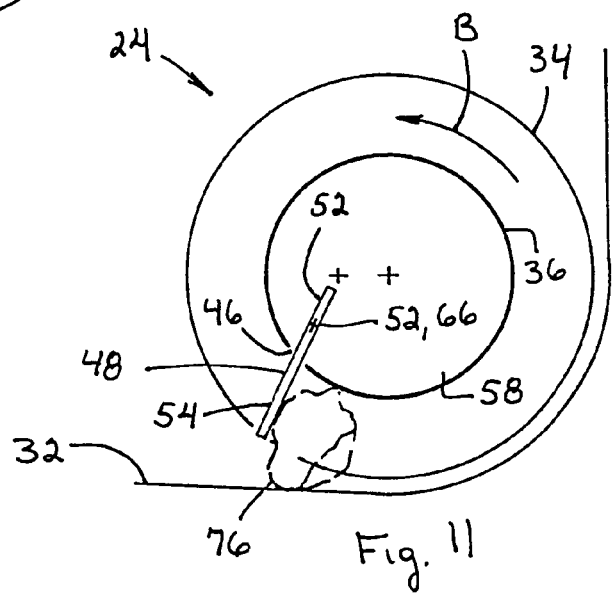
FIG. 11 is another simplified schematic side view of the header, illustrating rotation of the auger such that the finger is brought into contact with a hard object on a pan of the header.

More particularly, in FIG. 10, auger 34 is shown rotating in direction B with free end portion 54 of finger 48 extending radially outwardly through hole 46 of drum 36, mounting end portion 52 and failure region 56 being disposed in internal cavity 58 of drum 36. In FIG. 11, hard object 76 is shown lodged between pan 32 and the bottom of drum 36, which has rotated to bring free end portion 54 of finger 48 into contact with hard object 76. Mounting end portion 52 and failure region 56 of finger 48 are located in internal cavity 58 of drum 36.

Figure 12:
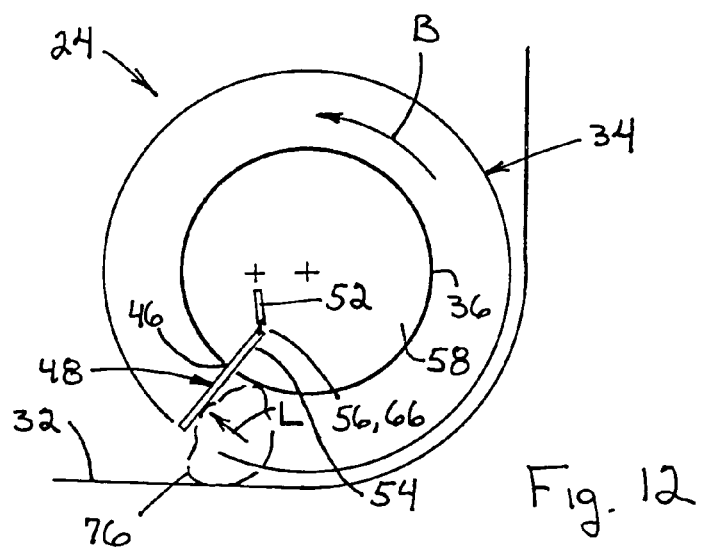
FIG. 12 is another simplified schematic side view of the header, illustrating further rotation of the auger and breakage of a failure region of the finger as a result the contact with the hard object and subsequent retention of the broken free end portion of the finger.

FIG. 12 shows subsequent rotation of auger 34 such that a side load L is applied by hard object 76 against free end portion 54 of finger 48, resulting in failure or breakage of failure region 56 of finger 48, retention of free end portion 54 on mounting end portion 52 by tethers 66, and pivotally movement of free end portion 54 relative to mounting end portion 52, as allowed and facilitated by tethers 66. With breakage of failure region 56, free end portion 54 of finger 48 is allowed to be longitudinally displaced from mounting end portion 53 as explained above, again as facilitated by tethers 66, to allow and facilitate the pivotally movement of free end portion 54 and also the continued rotation of auger 34, without subjecting mounting end portion 52 as structure in support thereof to increased loads, which could be potentially damaging thereto or to related componentry.

Figure 13:
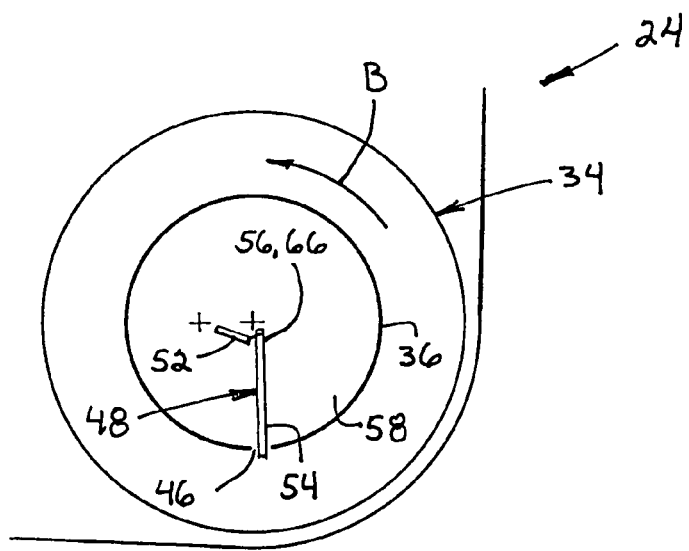
FIG. 13 is another simplified schematic side view of the header, showing still further rotation of the auger to cause partial retraction of the broken portion of the finger into a drum of the auger.
Figure 14:
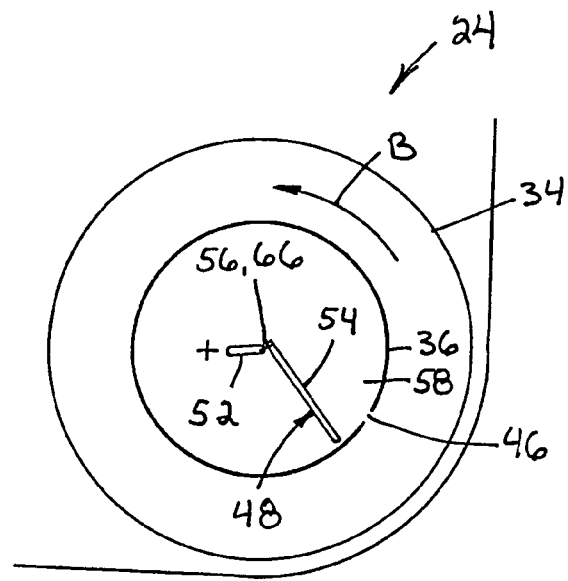
FIG. 14 is another simplified schematic side view of the header, showing the broken finger portion fully retracted into the drum.
Figure 15:
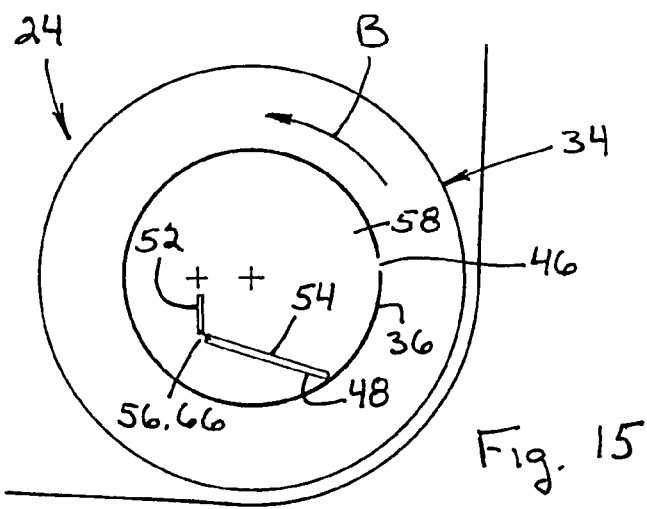
FIG. 15 is another simplified schematic side view of the header, showing a resting position of the broken finger portion within the drum.

In FIG. 13, free end portion 54 of finger 48 is shown retracted almost fully through hole 46 into internal cavity 58 so as to facilitate passage over a hard object 76 (FIGS. 10-12) and continued rotation of auger 34, as facilitated by tethers 66. In FIG. 14, free end portion 54 of finger 48 is shown removed from hole 46 by tethers 66, in cooperation with continued rotation of auger 34, so as to be located completely within internal cavity 58, mounting end portion 52 being freely rotatable with mounting sleeve 60 about auger finger shaft 62 (FIG. 2) to facilitate this. In FIG. 15, during continued rotation of auger 34, broken finger 48 is shown in a rest position with free end portion 54 resting against an internal surface of drum 36. Free end portion 54 will now be retained in this position by tether 66 throughout any subsequent rotation of auger 34.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An auger finger, comprising:
   a mounting end portion;
   an elongate free end portion opposite the mounting end portion;
   failure region at a predetermined location connecting the mounting and free end portions, the failure region being constructed so as to be weaker than at least the mounting end portion so as to break and disconnect the mounting and free end portions when the finger is subjected to a predetermined side loading condition;
   at least one tether connected between the free and mounting end portions and spanning the failure region so as to be capable of holding the free end portion in connection with the mounting end portion while allowing relative pivotal movement therebetween if the failure region is broken; and
   a rigid link configured to allow pivotal movement of the free end portion relative to the mounting end portion when the failure region is broken, wherein the rigid link has one end pivotally connected to the free end portion and an opposite end pivotally connected to the mounting end portion, the rigid link being configured to allow the free end portion and the mounting end portion to move a controlled distance apart when the failure region is broken to facilitate the relative pivotal movement of the free and mounting end portions.

2. The auger finger of claim 1, comprising two of the tethers on opposite sides of the failure region, respectively.

3. The auger finger of claim 1, wherein when the failure region is broken the tether will allow the relative pivotal movement of the mounting and free end portions only in a predetermined transverse direction corresponding to a direction of rotation of a drum on which the finger is mounted.

4. The auger finger of claim 3, wherein the predetermined transverse direction is a direction of rotation of an auger on which the finger is mounted.

5. The auger finger of claim 1, wherein the failure region comprises a groove in the finger.

6. The auger finger of claim 1, wherein the tether is connected to the mounting and free end portions by manually removable devices, respectively.

7. The auger finger of claim 1, wherein the mounting end of the finger is mounted in an internal cavity of a hollow drum of an auger rotatable in a predetermined rotational direction, such that the failure region is located within the cavity and the free end portion extends outwardly from a hole in the drum.

8. The auger finger of claim 7, wherein if the failure region breaks during rotation of the drum the tether will retract the entire free end portion through the hole and into the cavity within about one further revolution of the drum and thereafter retain the free end portion in the cavity.

9. An auger finger, comprising:
   an elongate rigid body including a mounting end portion, a free end portion opposite the mounting end portion, and a failure region at a predetermined location between the mounting and tree end portions and connecting the mounting and free end portions, the failure region being constructed so as to break and disconnect the free end portion from the mounting end portion when subjected to a predetermined side loading condition which is less than a side loading condition required for breaking at least the mounting end portion;
   at least one tether connected between the free end portion and the mounting end portion so as to span the failure region and hold the free end portion if the failure region is broken, while allowing relative pivotal movement of the free and mounting end portions about the broken failure region; and
   a rigid link having one end pivotally connected to the mounting end portion and an opposite end pivotally connected to the free end portion.

10. The auger finger of claim 9, wherein the finger is mounted in an internal cavity of a rotatable hollow drum of an auger of a grain header for an agricultural combine, such that the failure region is located within the cavity and the free end portion extends outwardly from the drum, the at least one tether being configured such that if the failure region is broken and the drum is further rotated, the tether will retract the free end portion into the cavity during the further rotation and thereafter retain the free end portion in the cavity.

11. The auger finger of claim 9, wherein the link is pivotally connected to at least one of the free end portion and the mounting end portion so as to allow limited relative longitudinal movement there between when the failure region is broken, to facilitate the relative pivotal movement of the free and mounting end portions about the broken failure region.

12. The auger finger of claim 9, comprising two of the tethers on opposite sides of the body, respectively.

13. The auger finger of claim 12, wherein when the failure region is broken the tethers will allow relative pivotal movement of the mounting and free end portions only in a predetermined transverse direction corresponding to a direction of rotation of a drum on which the finger is mounted.

14. The auger finger of claim 13, wherein the finger is mounted on an auger so as to be rotatable therewith in the predetermined direction.

15. The auger finger of claim 9, wherein the failure region comprises a groove in the finger.

16. The auger finger of claim 9, wherein the tether is connected to the mounting and free end portions by manually removable devices to allow removal of the free end portion from the mounting end portion when the failure region is broken.

17. An auger finger, comprising:
an elongate rigid body including a mounting end portion, a free end portion opposite the mounting end portion, and a failure region at a predetermined location between the mounting and free end portions, the failure region being constructed so as to break under a side loading condition which is less than side loading conditions required for breaking at least the mounting end portion; and
at least one tether connected between the free end portion and the mounting end portion so as to span the failure region and hold the free and mounting end portions together while allowing relative pivotal movement thereof if the failure region is broken, wherein the at least one tether is pivotally connected to at least one of the free end portion and the mounting end portion so as to allow limited relative longitudinal movement therebetween when the failure region is broken, to facilitate the relative pivotal movement of the free and mounting end portions about the broken failure region;
wherein the mounting end is mounted in an internal cavity of a rotatable hollow drum of an auger of a grain header for an agricultural combine such that the failure region is located within the cavity and the free end portion extends outwardly from the drum, and such that if the failure region is broken during rotation of the drum the tether will retract the free end portion into the cavity and retain the free end portion in the cavity.

18. The auger finger of claim 17, comprising two of the tethers on opposite sides of the body, respectively.

19. The auger finger of claim 18, wherein when the failure region is broken the tethers will allow relative pivotal movement of the mounting and free end portions only in a predetermined transverse direction corresponding to a direction of rotation of the drum.

20. The auger finger of claim 19, wherein the drum is mounted on a header for rotation in the predetermined direction.

21. The auger finger of claim 17, wherein the failure region comprises a groove in the finger.

22. The auger finger of claim 17, wherein the tether is connected to the mounting and free end portions by manually removable devices to allow removal of the free end portion from the mounting end portion when the failure region is broken.

23. A method of operation of a gathering auger of a header of an agricultural combine, comprising steps of:
providing an elongate auger finger having a mounting end portion, a free end portion opposite the mounting end portion, a failure region at a predetermined location between the mounting and free end portions,
and at least one tether connected between the free end portion and the mounting end portion and spanning the failure region, the tether being configured for holding the free and mounting end portions together while allowing relative pivotal movement thereof if the failure region is broken, the mounting end portion of the finger being mounted on an element in an internal cavity of a rotatable hollow drum of the auger such that the failure region and the at least one tether are located within the cavity and the free end portion extends outwardly from the drum through a hole in an outer surface thereof;
providing a rigid link having one end pivotally connected to the mounting end portion and an opposite end pivotally connected to the free end portion; and
if the failure region is broken, then during subsequent rotation of the drum, automatically operating the tether to retract the free end portion into the cavity and retain the free end portion in the cavity.

24. The method of claim 23, comprising the step of providing two of the tethers on opposite sides of the body, respectively.

25. The method of claim 23, comprising the step of providing tethers to allow relative pivotal movement of the mounting and free end portions only in a direction of rotation of the drum, when the failure region is broken.

* * * * *